(12) United States Patent
Al-Azemi

(10) Patent No.: US 8,893,660 B1
(45) Date of Patent: Nov. 25, 2014

(54) SUSPENDED BEE-BIRD WATERING DEVICE

(71) Applicant: Mubarak H. M. Sh. Kh. Al-Azemi, Al-Qurain (KW)

(72) Inventor: Mubarak H. M. Sh. Kh. Al-Azemi, Al-Qurain (KW)

( * ) Notice: Subject to any disclaimer, the term of this patent is extended or adjusted under 35 U.S.C. 154(b) by 0 days.

(21) Appl. No.: 14/340,533

(22) Filed: Jul. 24, 2014

(51) Int. Cl.
*A01K 39/02* (2006.01)
*A01K 53/00* (2006.01)
*A01K 39/026* (2006.01)

(52) U.S. Cl.
CPC ............... *A01K 39/02* (2013.01); *A01K 53/00* (2013.01)
USPC .................................. 119/72; 449/48; 119/77

(58) Field of Classification Search
CPC ... A01K 31/06; A01K 39/02; A01K 39/0206; A01K 53/00
USPC ............. 449/48; 119/6.5, 61.57, 72, 72.5, 77, 119/464
See application file for complete search history.

(56) References Cited

U.S. PATENT DOCUMENTS

| 1,022,762 | A | * | 4/1912 | White | 449/10 |
| 3,484,013 | A | | 12/1969 | Speicher | |
| 3,589,338 | A | * | 6/1971 | Lovitz | 119/51.01 |
| 6,817,314 | B1 | * | 11/2004 | Conte | 119/72.5 |
| 7,971,552 | B1 | * | 7/2011 | Rakoczy | 119/72 |
| 1,566,571 | A1 | | 5/2012 | Appleton | |

FOREIGN PATENT DOCUMENTS

| DE | 876 012 | * | 5/1953 | A01K 53/00 |
| GB | 488988 | | 7/1938 | |
| GB | 2472270 B | * | 1/2014 | A01K 39/02 |

* cited by examiner

*Primary Examiner* — Rob Swiatek
(74) *Attorney, Agent, or Firm* — Richard C Litman

(57) ABSTRACT

The suspended bee/bird watering device has a first embodiment specifically designed for dispensing drinking and cooling water to bees. A second embodiment is specifically designed for dispensing drinking and cooling water to birds. Both embodiments employ common features, such as a support rod, suspension hooks, insulated water reservoir, and dish-like container. Both embodiments are designed to be suspended from a support, such as a tree limb or wall. The first embodiment employs a porous, fibrous dispensing structure that allows the water to drip (in minimal amounts) from the reservoir into the dish. The second embodiment incorporates an elongate tube having an opening therein for conveying water from the reservoir to the dish.

14 Claims, 6 Drawing Sheets

SUSPENDED BEE-BIRD WATERING DEVICE

BACKGROUND OF THE INVENTION

1. Field of the Invention

The present invention generally relates to water dispensing systems, and particularly to a suspended bee/bird watering device for providing drinking water to birds and bees.

2. Description of the Related Art

It is a common practice to provide water for the various fauna that may frequent a yard, garden, or park area. This is especially true in providing water for birds and bees. It is well known that birds require water. In hot, dry weather, water may be scarce. Bird baths to provide wild birds with water for cleaning and drinking are quite common in gardens and the like. Although not as well known, bees also require water. The honey bee, for example, requires water for evaporative cooling of the bee hive, and also to dilute honey for feeding the larvae. A common estimate among beekeepers is that a hive of honey bees requires a quart of water daily. Although various devices have been used in the past for supplying water for birds and/or bees, there is still a need for devices that can provide a safe, low maintenance supply of clean water for birds and bees. Thus, a suspended bee/bird watering device solving the aforementioned problems is desired.

SUMMARY OF THE INVENTION

The suspended bee/bird watering device comprises first and second embodiments of a water dispensing assembly. The first embodiment is specifically designed far dispensing drinking and cooling water to bees. The second embodiment is specifically designed for dispensing drinking and cooling water to birds. Both embodiments employ common features, such as a support rod, suspension hooks, insulated water reservoir and dish-like container. Both embodiments are designed to be suspended from a support, such as a tree limb or wall. The first embodiment employs a porous, fibrous dispensing structure that allows the water to drip (in minimal amounts) from the reservoir to the dish. The second embodiment incorporates an elongate tube having open ends for conveying water from the reservoir to the dish.

Accordingly, the invention presents water dispensing systems that are utilized to provide drinking and refreshing water to birds or bees. The systems are portable and may be suspended from a tree branch or wall structure. The systems are designed to deliver water in controlled amounts from a reservoir, and provide insulation and cover for the reservoir for maintaining the water temperature and quality. The invention is designed to be portable, function in an efficient manner, and may be fabricated in various sizes. The invention provides for improved elements thereof in an arrangement for the purposes described that are inexpensive, dependable and fully effective in accomplishing their intended purposes.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
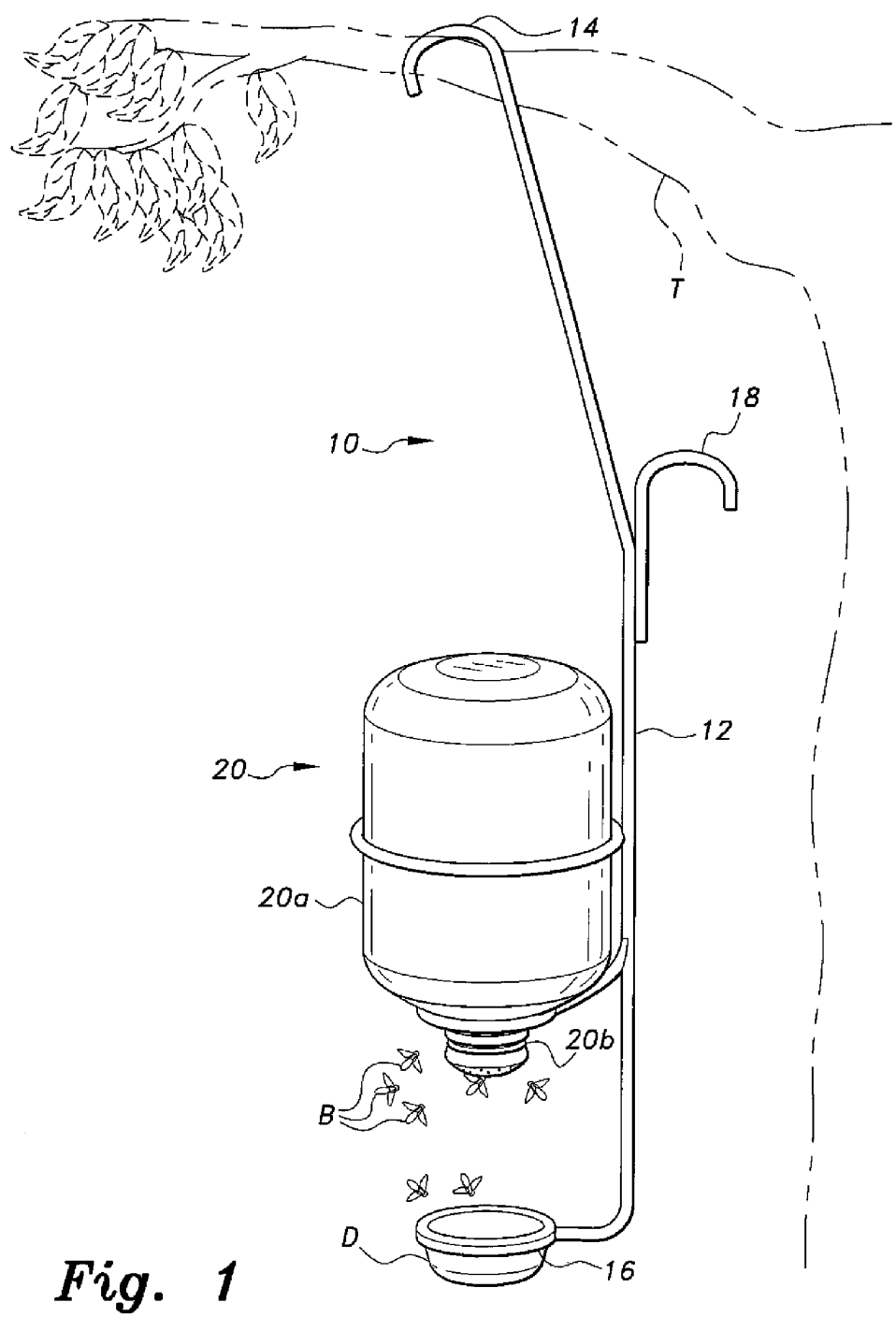
FIG. 1 is an environmental, perspective view of a first embodiment of a suspended bee/bird watering device according to the present invention.
Figure 2:
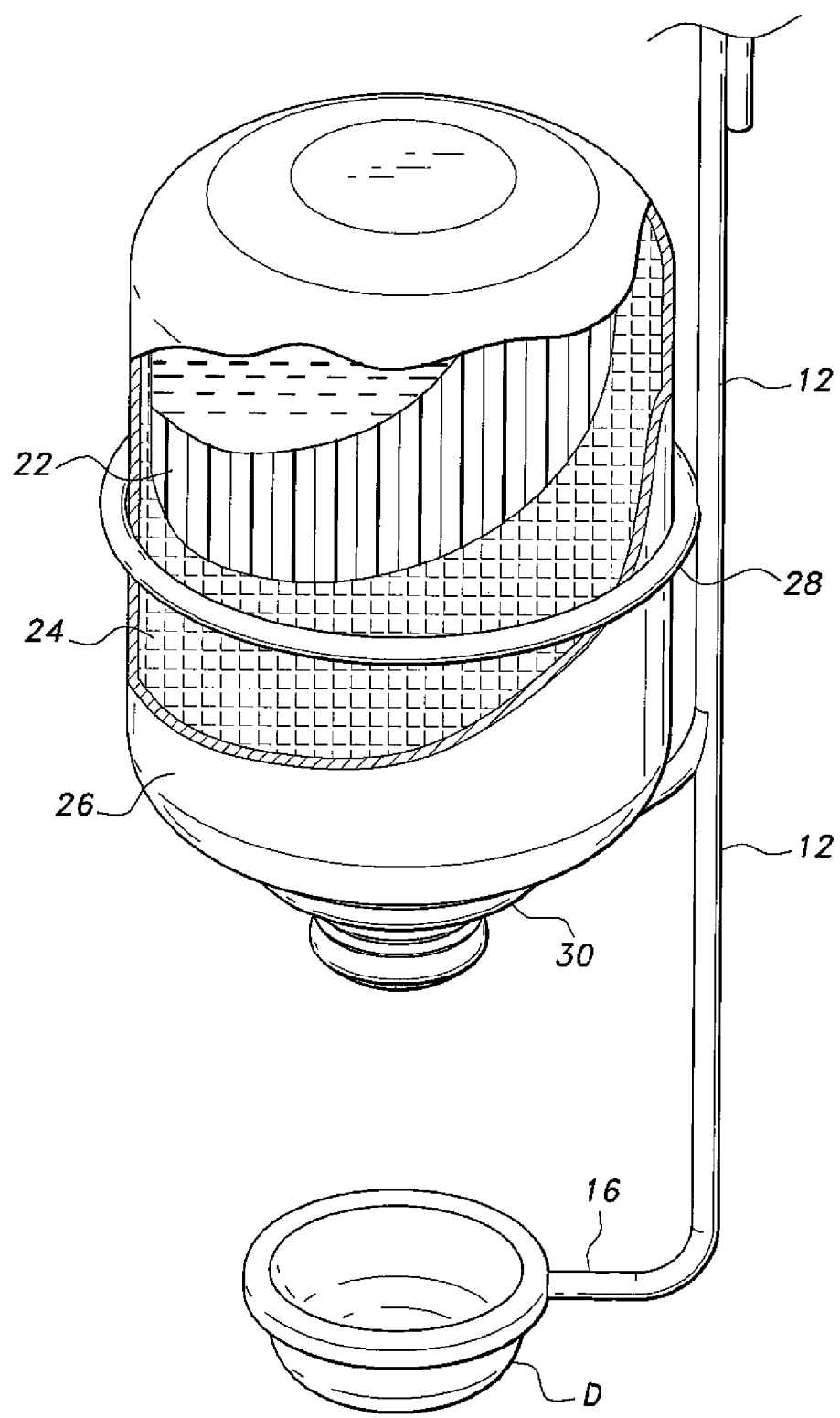
FIG. 2 is a partial perspective view of the device of FIG. 1, shown with the reservoir broken away and partially in section to show details thereof.
Figure 3:
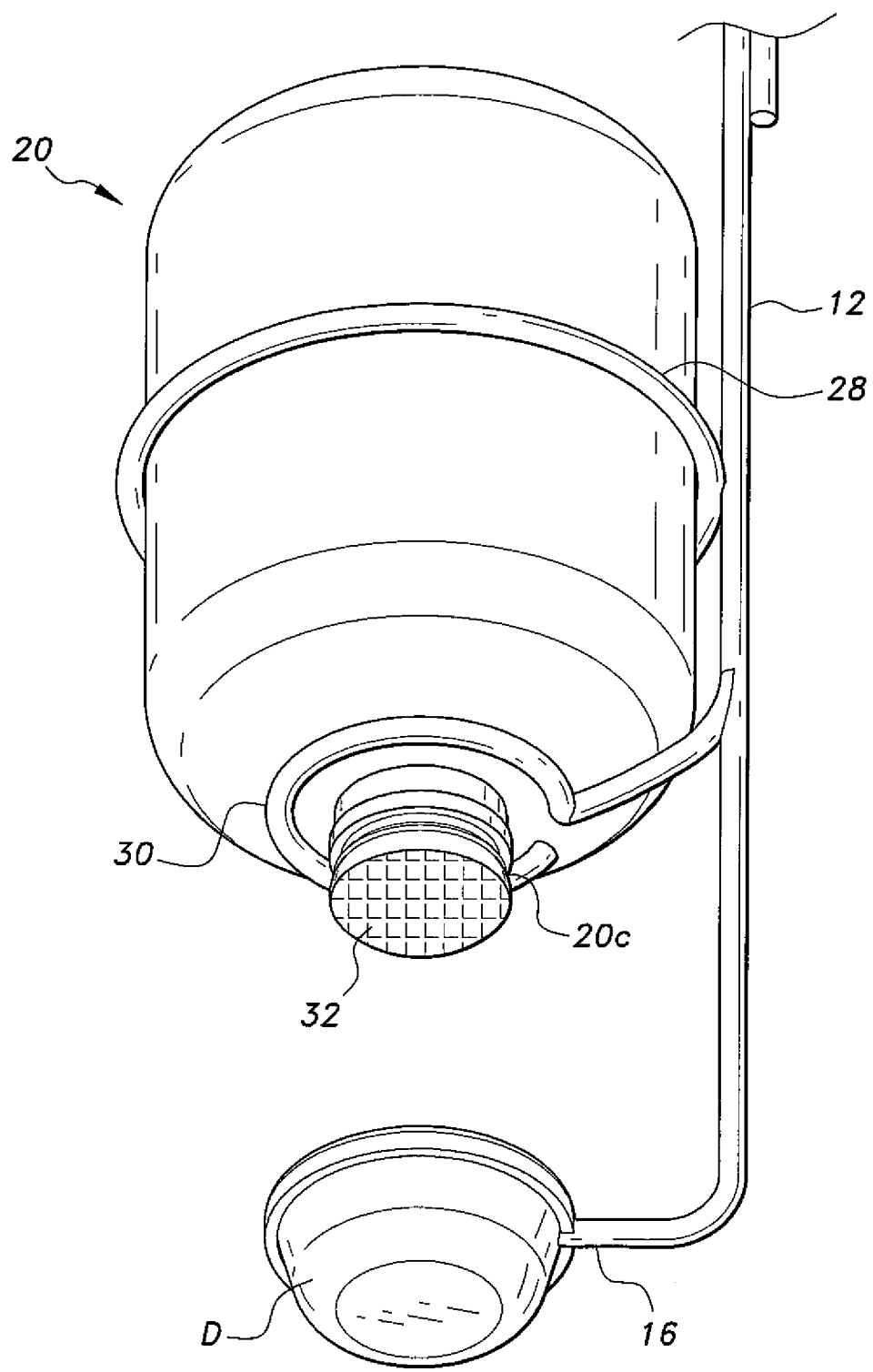
FIG. 3 is a partial perspective view of the device of FIG. 1 as seen from below, showing details of the dispenser.

FIGS. 1-3 show a first embodiment of the suspended bee/bird watering device, generally designated at 10. The watering device 10, which is designed specifically to service bees B, comprises a support rod 12 having an upper end and a lower end. The upper end terminates in a U-shaped configuration to define a hanger 14 for suspending the device from a tree limb T or the like. The lower end 16 of rod 12 is configured as a circle or ring for supporting a dish-like water container D thereon, the container D either having a circumferential flange that rests upon the ring at the lower end 16 of the rod 12, or having a frustoconical shape defining a small diameter bottom that passes through the ring and a wide diameter upper end having a diameter greater than the ring so that the upper end of the container D does not pass through the ring. A second hanger 18 is provided on the support rod 12 at a point intermediate the upper and lower ends. The second hanger 18 can be used to support the device 10 from a wall structure (not shown) or the like.

Rod 12 is adapted to support a water reservoir 20 thereon. In use, the reservoir 20 resembles an inverted water bottle having a body portion 20*a*, a neck portion 20*b* and an outlet or mouth 20*c*. As best illustrated in FIG. 2, the reservoir 20 comprises a wall 22, preferably fabricated from a plastic or glass material. The wall 22 is encased in a thermal insulation material 24, which is further encased in a nylon cover 26. The insulator material 24 and nylon cover 26 may be easily removed from the reservoir 20 for cleaning. The insulation 24 maintains the water in a relatively cool temperature range. The nylon cover 26 shields the water from light, and thus prohibits water quality deterioration. A circular body stabilizing support 28 and a circular neck stabilizing support 30 are attached to the rod 12 and receive the body portion 20*a* and neck portion 20*b* therein, respectively, to provide stability when the reservoir 20 is supported on the rod 12. The outlet 20*c* of reservoir 20 is provided with a porous, fibrous element 32 (shown in FIG. 3) that permits the water in the reservoir to drip into the container D in a controlled manner. The controlled drip prevents excessive water flow from inundating the container D, thereby swamping and killing the bees that come to drink.

Figure 4:
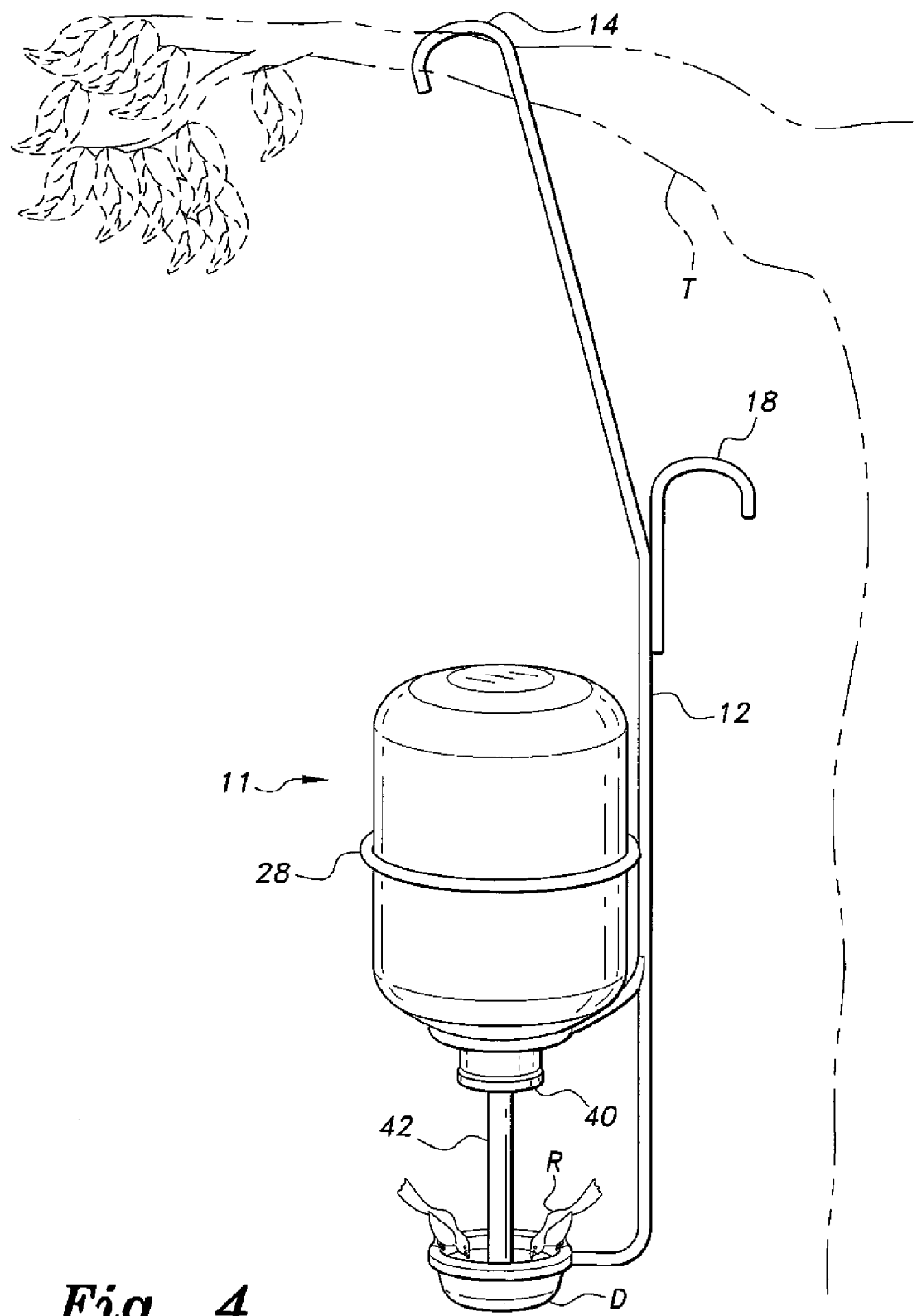
FIG. 4 is an environmental, perspective view of a second embodiment of a suspended bee/bird watering device according to the present invention.
Figure 5:
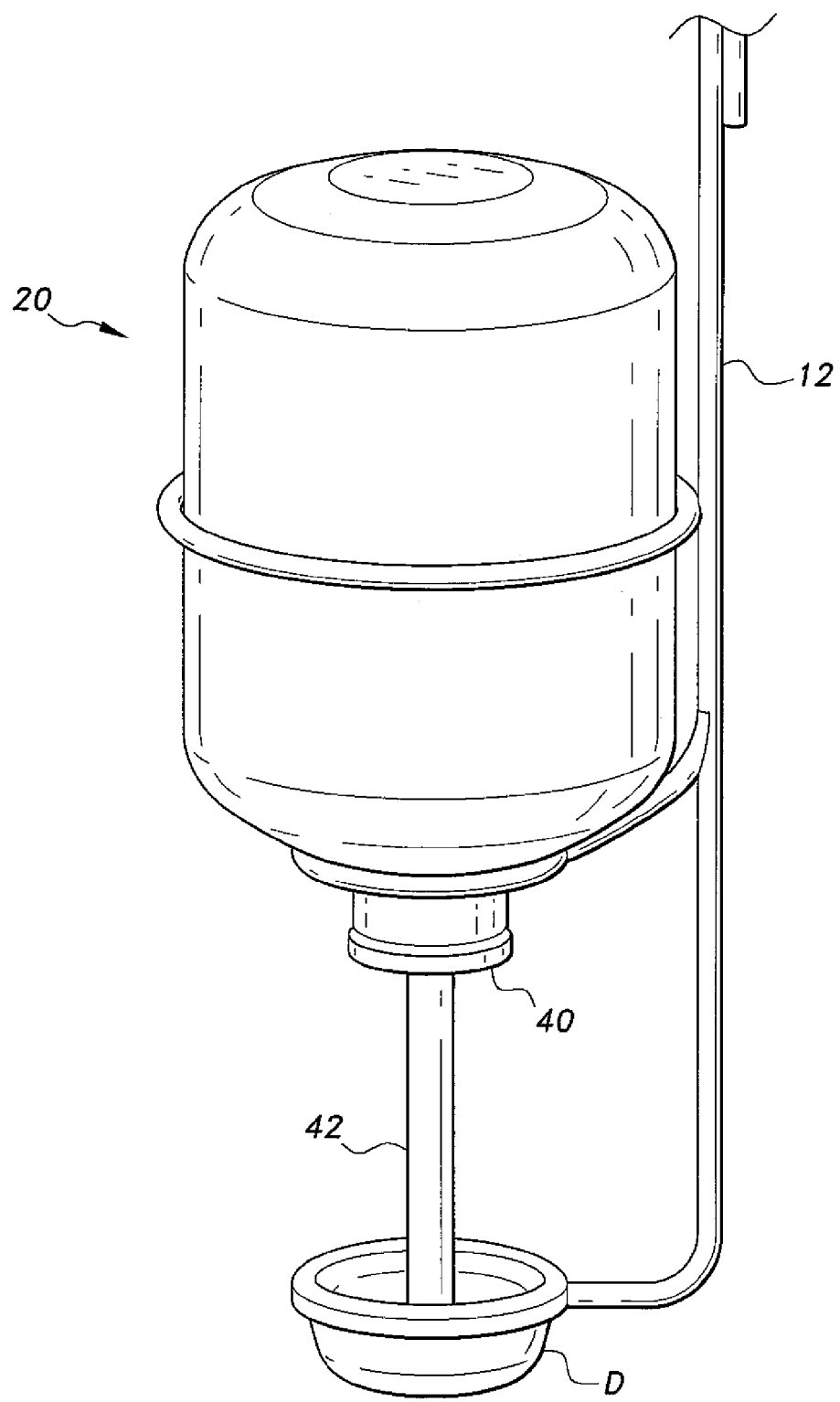
FIG. 5 is a partial perspective view of the device of FIG. 4.
Figure 6:
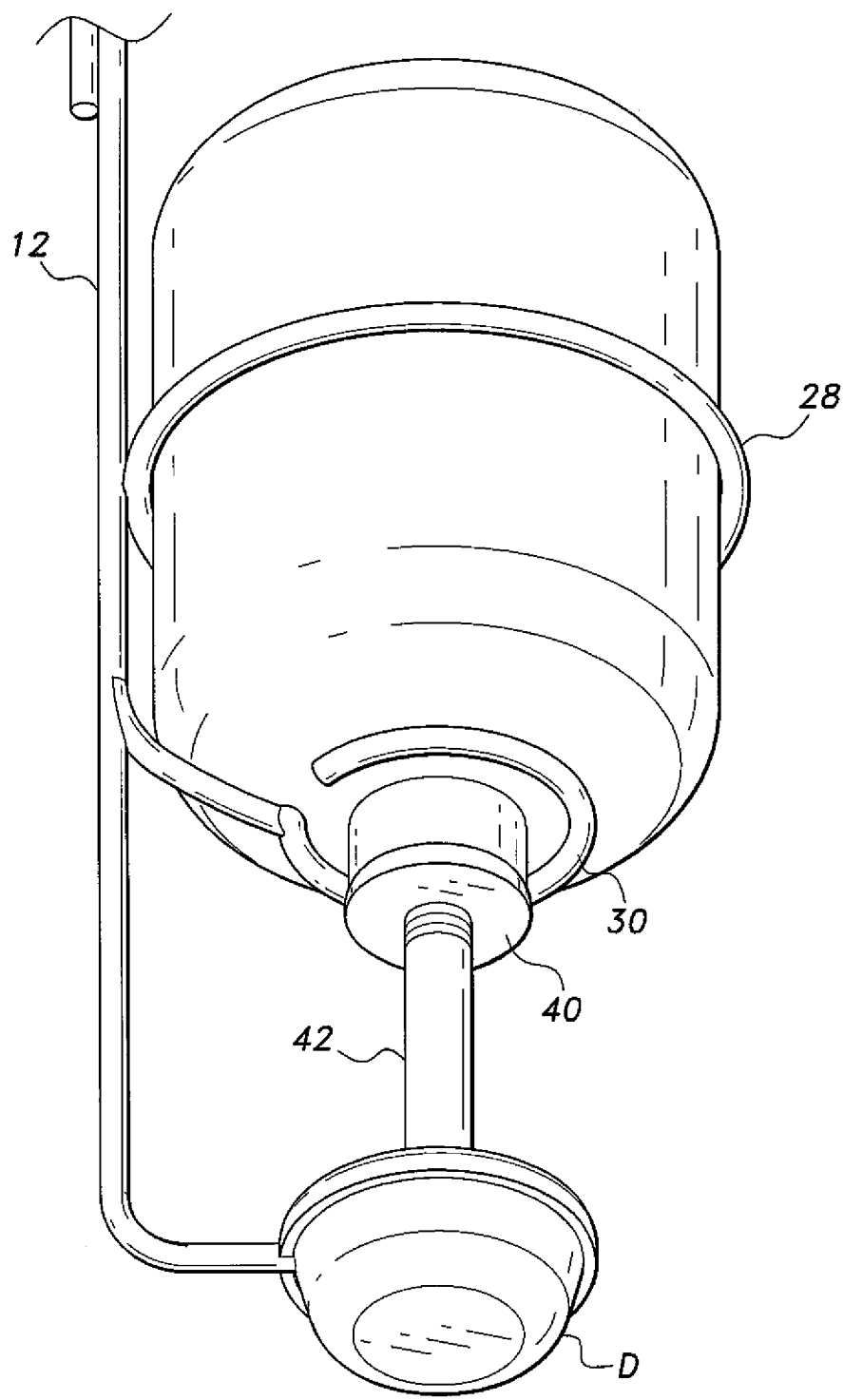
FIG. 6 is a partial perspective view of the device of FIG. 4 as seen from below, showing details of the dispenser.

FIGS. 4-6 illustrate a second embodiment of the suspended bee/bird watering device, generally indicated at 11, which is especially adapted to provide refreshing drinking water to birds R. The second embodiment employs the identical support elements, dish-like container and reservoir structure as described for the first embodiment. However, the outlet 20*c* of the reservoir 20 is closed by a cap 40 having a central opening. A tube 42 extends from the opening in the cap 40 into the dish D. The tube 42 is open at both ends to allow water to flow from reservoir 20 into the dish D. The lower end of tube 42 will be submerged by water in the dish D to control the flow of water from the reservoir 20.

It is to be understood that the present invention is not limited to the embodiments described above, but encompasses any and all embodiments within the scope of the following claims.

I claim:

1. A suspended watering device, comprising:
   an elongate rod having an upper end defining a first U-shaped hanger and a lower end defining a circular support member;
   a second U-shaped hanger attached to the support rod intermediate the upper end and the lower end;
   a dish supported on the circular support member; and
   a water reservoir supported on the elongate rod at a position above the dish, the reservoir having an outlet positioned above the dish.

2. The suspended watering device according to claim 1, further including a pair of stabilizing support members attached to said rod and engaging said water reservoir to stabilize said reservoir on said rod.

3. The suspended watering device according to claim 1, wherein said water reservoir has a body portion and a neck portion, the outlet being positioned in the neck portion.

4. The suspended watering device according to claim 1, wherein said water reservoir is encased in a thermal insulation material.

5. The suspended watering device according to claim 4, wherein said thermal insulation material is removable from said reservoir.

6. The suspended watering device according to claim 1, wherein said water reservoir is encased in a nylon cover.

7. The suspended watering device according to claim 6, wherein said nylon cover is removable from said reservoir.

8. The suspended watering device according to claim 1, further comprising a porous, fibrous material covering said outlet, whereby water in the reservoir drips from said outlet into said dish.

9. The suspended watering device according to claim 1, further comprising:
   a cap covering said outlet, the cap having a central opening therein; and
   a tube extending from the central opening in the cap into said dish, whereby water flows from the reservoir through the tube into the dish.

10. A suspended watering device, comprising:
    an elongate rod having an upper end defining a first U-shaped hanger and a lower end defining a circular support member;
    a second U-shaped hanger attached to the support rod intermediate the upper end and the lower end;
    a dish supported on the circular support member;
    a water reservoir supported on the elongate rod at a position above the dish, the reservoir having a covered outlet positioned above the dish;
    thermal insulation material surrounding the water reservoir; and
    a pair of stabilizing support members attached to the rod and engaging the water reservoir to stabilize the reservoir on the rod.

11. The suspended watering device according to claim 10, wherein said water reservoir has a body portion and a neck portion, the outlet being positioned in the neck portion.

12. The suspended watering device according to claim 10, further comprising a nylon cover encasing said water reservoir and said thermal insulation.

13. The suspended watering device according to claim 10, further comprising a porous, fibrous material covering said outlet, whereby water in the reservoir drips from said outlet into said dish.

14. The suspended watering device according to claim 10, further comprising:
    a cap covering said outlet, the cap having a central opening therein; and
    a tube extending from the central opening in the cap into said dish, whereby water flows from the reservoir through the tube into the dish.

\* \* \* \* \*